(12) United States Patent
Brown et al.

(10) Patent No.: US 10,858,925 B2
(45) Date of Patent: Dec. 8, 2020

(54) CROSSOVER SYSTEM AND APPARATUS FOR AN ELECTRIC SUBMERSIBLE GAS SEPARATOR

(71) Applicant: Halliburton Energy Services, Inc., Houston, TX (US)

(72) Inventors: Donn J. Brown, Broken Arrow, OK (US); Thomas John Gottschalk, Houston, TX (US); Walter Russell Dinkins, Tulsa, OK (US); Jimmie Allen Buckallew, Collinsville, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/335,223

(22) PCT Filed: Aug. 8, 2018

(86) PCT No.: PCT/US2018/045810
§ 371 (c)(1),
(2) Date: Mar. 20, 2019

(87) PCT Pub. No.: WO2019/045979
PCT Pub. Date: Mar. 7, 2019

(65) Prior Publication Data
US 2019/0249537 A1 Aug. 15, 2019

Related U.S. Application Data

(60) Provisional application No. 62/551,850, filed on Aug. 30, 2017.

(51) Int. Cl.
*E21B 43/38* (2006.01)
*E21B 43/12* (2006.01)
(Continued)

(52) U.S. Cl.
CPC .......... *E21B 43/38* (2013.01); *B01D 19/0057* (2013.01); *E21B 43/12* (2013.01);
(Continued)

(58) Field of Classification Search
CPC ....... E21B 43/121; E21B 43/38; E21B 43/128
See application file for complete search history.

(56) References Cited

U.S. PATENT DOCUMENTS 7,461,692 B1 12/2008 Wang
8,747,078 B2 * 6/2014 Brown .................... F04D 13/10
166/105.5

(Continued)

FOREIGN PATENT DOCUMENTS

WO 2015020798 A1 2/2015

OTHER PUBLICATIONS

International Search Report and Written Opinion dated Dec. 4, 2018, International PCT Application No. PCT/US2018/045810.

*Primary Examiner* — Tara Schimpf
(74) *Attorney, Agent, or Firm* — McGuireWoods LLP

(57) ABSTRACT

A crossover system, method and apparatus for an electric submersible pump (ESP) gas separators. A crossover of an ESP gas separator includes a first helical pathway for higher density fluid that extends at an angle of 10° to 40° from a horizontal plane through the crossover, the first helical pathway fluidly coupled to a spider bearing including crescent shaped vanes that remove rotational momentum from the higher density fluid, a second helical pathway for lower density fluid that tangentially intersects a crossover jacket, the first helical pathway and the second helical pathway defined by a channel having teardrop shaped openings in the crossover jacket that define channel exit ports venting to a casing annulus, and teardrop shaped openings in a crossover skirt that define a channel entrance, where the first helical (Continued)

pathway is around the channel and the second helical pathway is through an inside of the channel.

23 Claims, 11 Drawing Sheets

(51) Int. Cl.
*F04D 13/08* (2006.01)
*F04D 31/00* (2006.01)
*B01D 19/00* (2006.01)
*F04D 13/10* (2006.01)

(52) U.S. Cl.
CPC .......... *E21B 43/121* (2013.01); *E21B 43/126* (2013.01); *E21B 43/128* (2013.01); *F04D 13/08* (2013.01); *F04D 13/10* (2013.01); *F04D 31/00* (2013.01)

(56) References Cited

U.S. PATENT DOCUMENTS

| | | |
|---|---|---|
| 2005/0261683 A1 | 12/2005 | Brown et al. |
| 2006/0245945 A1 | 11/2006 | Wilson et al. |
| 2011/0162832 A1 | 7/2011 | Reid |
| 2014/0216720 A1* | 8/2014 | Wang ................ B01D 19/0052 166/105.5 |

* cited by examiner

CROSSOVER SYSTEM AND APPARATUS FOR AN ELECTRIC SUBMERSIBLE GAS SEPARATOR

BACKGROUND OF THE INVENTION

1. Field of the Invention

Embodiments of the invention described herein pertain to the field of gas separators for electric submersible pumps. More particularly, but not by way of limitation, one or more embodiments of the invention enable a crossover system, method and apparatus for an electric submersible gas separator.

2. Description of the Related Art

Fluid, such as gas, oil or water, is often located in underground formations. In such situations, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser, together referred to as a "stage." Multistage centrifugal pumps use several stages of impeller and diffuser pairs to further increase the pressure lift.

One challenge to economic and efficient ESP operation is pumping gas laden fluid. When pumping gas laden fluid, the gas may separate from the other fluid due to the pressure differential created when the pump is in operation. If there is a sufficiently high gas volume fraction (GVF), typically around 10% to 15%, the pump may experience a decrease in efficiency and decrease in capacity or head (slipping). If gas continues to accumulate on the suction side of the impeller it may entirely block the passage of other fluid through the centrifugal pump. When this occurs the pump is said to be "gas locked" since proper operation of the pump is impeded by the accumulation of gas.

Conventional ESPs often include a gas separator attached below the centrifugal pump in an attempt to separate gas out of the multi-phase fluid before the gas reaches the pump. The two most common types of gas separator are vortex type and rotary type separators. Both vortex and rotary type separators separate gas from the well fluid by inertia of rotation before fluid enters the pump. Such centrifugal separation forces higher density, gas poor fluid outward, while lower density, gas rich fluid remains inward near the shaft. Next, the fluid travels to a crossover, which partitions the two fluid streams. The lower density, gas rich fluid vents into the casing annulus between the ESP assembly and the well casing, while the higher density, gas poor fluid is guided to the centrifugal pump.

Because gas separators use the inertia of rotational motion to separate fluid, fluid entering the crossover is spinning. Since the crossover directs gas rich fluid and gas poor fluid in different directions, the spinning fluid abruptly changes direction inside the conventional crossover. The abrupt changes in direction result in disruptive turbulence that degrades the efficiency of the gas separator. The turbulence impedes the flow of fluid, causing gas to accumulate and coalesce into bubbles inside the conventional crossover. The gas bubbles can become entrapped in fluid traveling into the pump, leading to gas lock. Additionally, the lower density, gas rich fluid being directed towards the casing annulus readily loses momentum often preventing the gas from ever reaching the casing annulus.

Conventionally, the trajectory of higher density, gas poor fluid flowing towards the centrifugal pump also includes sharp turns as the higher density fluid circumnavigates around the vent ports of the lower density fluid. The induced turbulence causes collisions between the higher density fluid and the walls of the crossover passageway. Because the higher density fluid is often laden with abrasive solids, the result is internal pressure changes, erosive damage and scale blocking inside the conventional crossover.

Yet another problem with conventional crossovers, is that higher density fluid exiting the crossover retains leftover rotational momentum, sometimes called "pre-rotation." Pre-rotation of fluid at the pump entrance will limit the pump impeller vanes from cutting through the production fluid and delivering the fluid downstream. As a result, pre-rotation of the well fluid will degrade the pump's efficiency and overall performance, which can limit the production rate of the ESP assembly.

As is apparent from the above, conventional crossovers employed in gas separators suffer from several deficiencies. Therefore, there is need for an improved crossover apparatus, method and system for an electric submersible gas separator.

BRIEF SUMMARY OF THE INVENTION

One or more embodiments of the invention enable a crossover apparatus, method and system for an electric submersible gas separator.

A crossover apparatus, method and system for an electric submersible as separator is described. An illustrative embodiment of a crossover of an electric submersible pump (ESP) gas separator includes a teardrop shaped channel extending helically between and through a crossover skirt at an entrance to the channel, the crossover skirt inwards of a crossover jacket, the crossover jacket at an exit of the channel, the exit of the channel above the entrance to the channel, and the teardrop shape of the channel having a rounded side opposite a pointed side and a top channel surface extending therebetween, wherein the top channel surface extends between ten degrees and forty degrees upward from the pointed side, and the channel defining a first helical passageway inside the channel for lower density, gas rich fluid flowing inside the passageway, wherein the first helical passageway tangentially intersects the crossover jacket, and a second helical passageway around the channel for higher density, gas poor fluid flowing outside of the passageways, and a spider bearing fluidly coupled to the higher density, gas poor fluid downstream of the second helical passageway, the spider bearing including a plurality of crescent-shaped spider vanes extending radially outward from a spider bearing hub, the crescent shaped spider vanes having a concave surface that receives incoming higher density, gas poor fluid. In some embodiments, the crossover jacket is secured inside a gas separator housing downstream of one of a rotary or vortex generator. In certain embodiments, the channel exit is aligned with a housing port through the gas separator housing such that the channel exit is fluidly coupled to a casing annulus. In some embodiments, the channel entrance is positioned on a concave top portion of the crossover skirt. In certain embodiments, the position of the channel entrance on the concave top portion of the crossover skirt curves the channel entrance to tangentially align with the curvature of the lower density, gas rich fluid entering the channel entrance. In some embodiments, each channel entrance is 10-70% larger than conventional entrance ports in comparable conventional gas separator designs. In certain embodiments, an upper surface of a top wall of the channel extends ten to forty degrees from horizontal and guides higher density, gas poor fluid at same trajectory. In some embodiments, each channel curves as the channel extends upward from the crossover skirt to the crossover jacket. In certain embodiments, the channel tangentially intersects the jacket. In some embodiments, the tangential intersection guides fluid out the crossover exit tangentially to an inner wall of the crossover jacket. In certain embodiments, the spider bearing imparts axial momentum into the higher density, gas poor fluid exiting flowing around the passageways. In some embodiments, the spider bearing provides radial support to a shaft extending centrally through the crossover. In certain embodiments, the higher density, gas rich fluid is delivered to a centrifugal pump with lower GVF and reduced pre-rotation.

An illustrative embodiment of a crossover of an electric submersible pump (ESP) gas separator includes a first helical pathway that guides gas poor, higher density fluid at an angle of 10 to 40 degrees from a horizontal plane as the gas poor, higher density fluid travels through the crossover, the first helical pathway fluidly coupled to a spider bearing including crescent shaped vanes that remove rotational momentum from the gas poor, higher density fluid as the gas poor, higher density fluid exits the crossover; and a second helical pathway that guides gas rich, lower density fluid tangentially through exit ports of the crossover that vent to a casing annulus, and the first helical pathway and the second helical pathway defined by a channel having teardrop shaped openings in a crossover jacket that define the exit ports and teardrop shaped openings in the crossover skirt that define an entrance to the channel, where the first helical pathway is around the channel and the second helical pathway is through an inside of the channel. In some embodiments, the teardrop shaped openings in the crossover skirt are positioned on a concave top portion of the skirt. In certain embodiments, the curved orientation of the tear drop shaped openings extending around the concave top portion of the skirt provides the lower density, gas rich fluid a tangentially oriented entrance to the gas poor fluid helical passageway. In some embodiments, each teardrop shaped opening on the crossover skirt is 10-70% larger in surface area than conventional crossover skirt openings. In certain embodiments, a top surface of the channel extends upward at ten to forty degrees from horizontal and guides the higher density, gas poor fluid upward at same trajectory. In some embodiments, the channel tangentially intersects the jacket. In certain embodiments, the spider bearing imparts axial momentum to the higher density, gas poor fluid traveling around the passageways and continuing past the spider bearing. In some embodiments, the spider bearing provides radial support to a drive shaft extending through the crossover. In certain embodiments, the crossover of an ESP gas separator includes a plurality of the channels.

An illustrative embodiments of a method of separating higher density, gas poor fluid from lower density, gas rich fluid in a gas separator that operates to separate multi-phase fluid by rotational inertia includes maintaining a helical trajectory of lower density, gas rich fluid by sending the lower density, gas rich fluid through an inside of a helically extending, teardrop-shaped channel that vents vent to a casing annulus, preserving a helical trajectory of higher density, gas poor fluid by sending the higher density, gas poor fluid around the helical channel, and removing rotational momentum from the higher density, gas poor fluid after the higher density, gas poor fluid passes around the helical channel, by guiding the higher density, gas poor fluid through a spider bearing having crescent shaped vanes and a concave surface that curves in a direction opposite the rotational direction of the higher density, gas poor fluid. In certain embodiments, the method further includes delivering the higher density, gas poor fluid to a pump intake with lower rotational momentum and GVF than fluid entering the gas separator.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
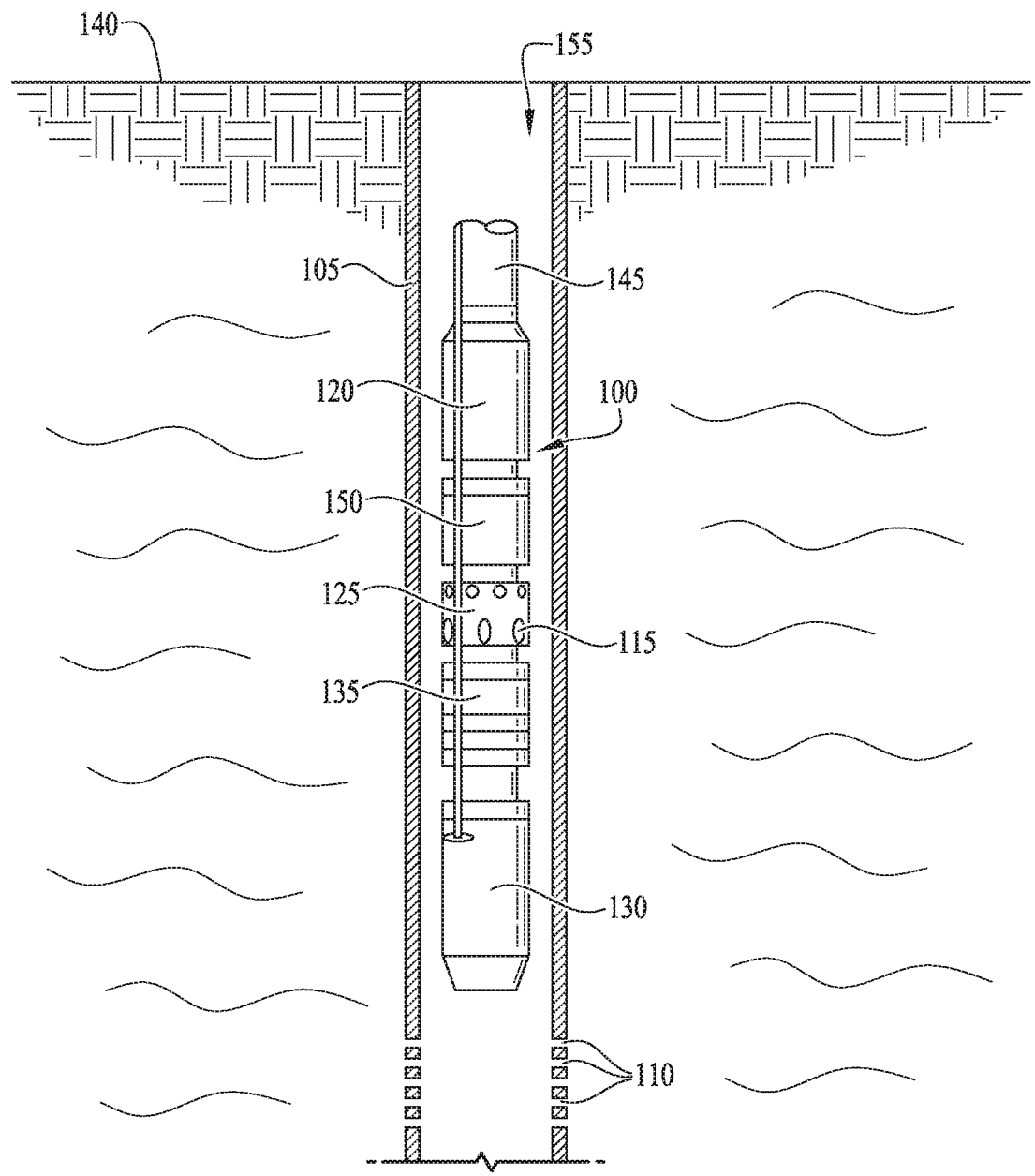
FIG. 1 is a perspective view of an electric submersible pump (ESP) assembly of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A crossover system, method and apparatus for an electric submersible gas separator is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to an "opening" includes one or more openings.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of an ESP assembly element such as a gas separator and/or the opening of a component through which the shaft would extend.

As used herein, the term "inner", "inside" or "inward" means the radial direction toward the center of the shaft of an ESP assembly element such as a gas separator and/or the opening of a component through which the shaft would extend.

As used herein the terms "axial", "axially", "longitudinal" and "longitudinally" refer interchangeably to the direction extending along the length of the shaft of an ESP assembly component such as an ESP intake, multi-stage centrifugal pump, seal section, gas separator or charge pump.

"Downstream" refers to the direction substantially with the principal flow of working fluid when the pump assembly is in operation. By way of example but not limitation, in a vertical downhole ESP assembly, the downstream direction may be towards the surface of the well. The "top" of an element refers to the downstream-most side of the element.

"Upstream" refers to the direction substantially opposite the principal flow of working fluid when the pump assembly is in operation. By way of example but not limitation, in a vertical downhole ESP assembly, the upstream direction may be opposite the surface of the well. The "bottom" of an element refers to the upstream-most side of the element.

"Teardrop" refers to a shape having a wider, rounded side or end opposite a tapered and/or pointed side or end.

For ease of description and so as not to obscure the invention, illustrative embodiments are primarily described with reference to a motor operating at or about 60 Hz, which theoretically corresponds to a drive shaft rotation of about 3600 revolutions-per-minute (RPM). Illustrative embodiments may therefore include geometry that is based on about 3550 RPM of energy imparted on the well fluid during operation, which accounts for slip and other energy losses in the rotating fluid that slow rotation. However, illustrative embodiments are not so limited and may be equally applied to ESPs operating anywhere from 30 Hz to 70 Hz, and the resulting rotational speed of the drive shaft and/or fluid.

Illustrative embodiments may reduce turbulence in fluid flowing through the crossover of a gas separator by improving the geometry of the crossover's passageways. One or more of the improvements of illustrative embodiments may increase the efficiency of the crossover as well as the gas separator's overall performance, thus improving centrifugal pump efficiency. Illustrative embodiments may guide lower density, gas rich fluid toward the casing annulus for ventilation with improved momentum and a reduced likelihood of gas reentrapment and the resulting gas lock. Illustrative embodiments may deliver higher density, gas poor fluid to a centrifugal pump with reduced pre-rotation, which may improve the pump's efficiency and overall performance. Illustrative embodiments may reduce scale blocking, erosion, and abrasive damage resulting from higher density, gas poor fluid carrying sand into the gas separator.

Illustrative embodiments may provide: (1) a specific angle or trajectory for higher density, gas poor fluid flowing through the crossover of illustrative embodiments, creating less resistance and turbulence in the stream, (2) tangential communicated exit ports in the flow path of the lower density, gas rich fluid chamber of the crossover, which may also provide for lower resistance and turbulence, and (3) a spider bearing support within the crossover designed to inject a non-rotation component to the higher density, gas poor fluid exiting the crossover, which may increase the downstream pump's efficiency.

Illustrative embodiments may include a plurality of teardrop shaped channels, which channels define a first helical passageway inside each channel for lower density, gas rich fluid and a second helical passageway around the outside of each channel for higher density, gas poor fluid. The first and second helical passageways may guide the corresponding fluid streams into and out of the passageways with a tangential component that provides gentle entrance and exit angles for the fluid, which may reduce turbulence, gas reentrapment, erosion and/or abrasive wear. The top, upper surface of the channel may serve as a support wall for the higher density, gas poor fluid, which support wall may be tilted to guide the gas poor fluid gently upward at a 10-40° angle from a horizontal plane, as compared to steeper angles of conventional crossovers that are typically 45°. An entrance of the first helical passageway inside the channel, formed at the intersection between each channel and the crossover skirt, may extend along a concave top section of the skirt and may be 10-70% larger in surface area than conventional openings in comparable conventional crossover designs, which entrances may guide gas rich fluid with a gentle entrance angle into the first helical passageway. A first helical passageway exit may be formed at a tangential intersection between each channel and the crossover jacket, which tangential intersection may allow the passageway exit to guide gas rich fluid out of the first helical passageway with a gentle exit angle. Illustrative embodiments may include a modified spider bearing fluidly coupled to the higher density, gas poor fluid exiting the second helical passageways. The spider bearing of illustrative embodiments may include crescent shaped vanes having a concave surface that receives incoming fluid and remove rotational momentum of the gas poor fluid by ramping the fluid upward in an increasingly axial direction. The spider bearing vanes may provide axial momentum to the higher density, gas poor fluid, which may prevent pre-rotation in a downstream centrifugal pump. The spider bearing of illustrative embodiments may provide radial support to the drive shaft, which may prevent operation-limiting damage to the ESP assembly.

Illustrative embodiments may include an artificial lift assembly, such as an ESP assembly, which may be located downhole below the surface of the ground. FIG. 1 shows an exemplary ESP assembly 100. ESP assembly 100 may be positioned within well casing 105, which may separate ESP assembly 100 from an underground formation. Well fluid may enter casing 105 through perforations 110 and travel downstream inside casing annulus 155 to intake ports 115. Intake ports 115 may serve as the intake for ESP pump 120 and may be located on an ESP intake section or may be integral to gas separator 125. Gas separator 125 may be a vortex or rotary separator and may serve to separate gas from the well fluid before it enters ESP pump 120. Motor 130 may be an electric submersible motor that operates to turn ESP pump 120 and may, for example, be a two-pole, three-phase squirrel cage induction motor. Seal section 135 may be a motor protector, serving to equalize pressure and keep motor oil separate from well fluid. ESP Pump 120 may be a multi-stage centrifugal pump and may lift fluid to surface 140. Production tubing 145 may carry pumped fluid to surface 140, and then into a pipeline, storage tank, transportation vehicle and/or other storage, distribution or transportation means. In gassy wells, charge pump 150 may be employed between primary pump 120 and gas separator 125 as a lower tandem pump to boost fluid before it enters production pump 120.

Figure 2:
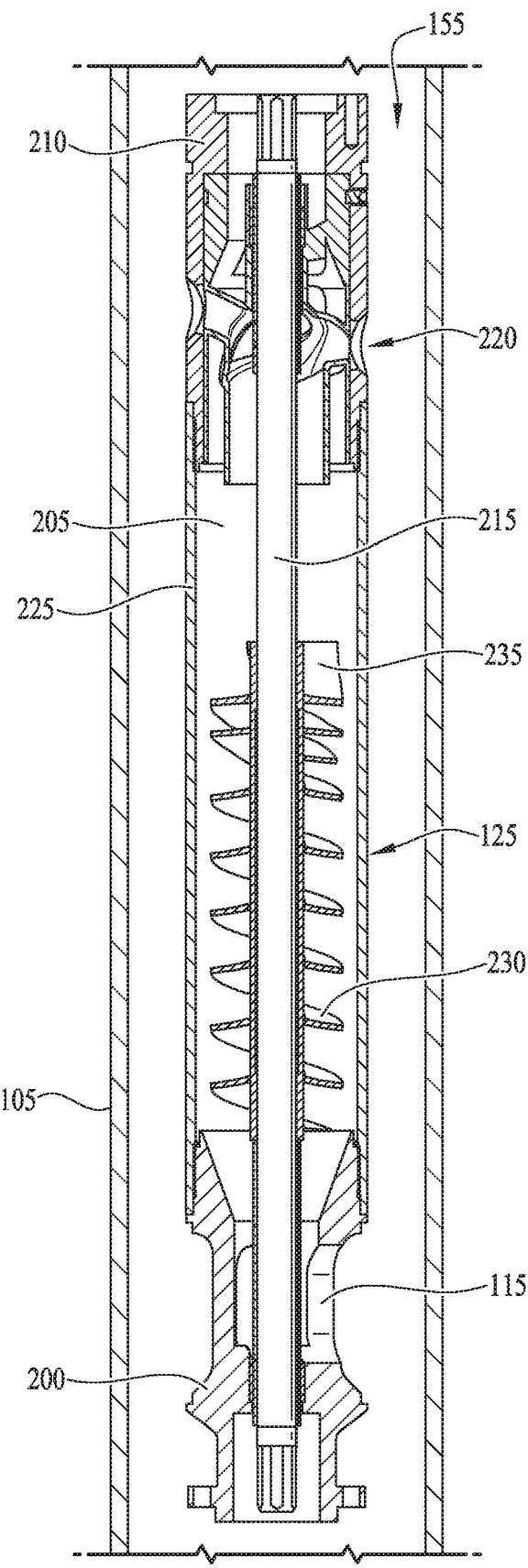
FIG. 2 is a cross-sectional view of a gas separator of an illustrative embodiment.

FIG. 2 shows an exemplary gas separator of an illustrative embodiment. Gas separator 125 may include from upstream to downstream, intake section 200, separation chamber 205, and crossover 210. Inlet ports 115 may be spaced circumferentially around intake section 200 and serve as the intake for fluid into ESP assembly 100. Multi-phase well fluid may enter inlet ports 115 from casing annulus 155 and travel downstream through separation chamber 205. While inside separation chamber 205, well fluid may be separated by inertia of rotation into higher-density, gas poor fluid and lower-density, gas rich fluid. Housing 225 may separate separation chamber 205 and/or gas separator 125 from casing annulus 155 and may serve as a supportive structure that transmits axial loads across gas separator 125. Housing ports 220 may be spaced around housing 225 and may allow the lower density, gas rich fluid to exit gas separator 125 and vent into casing annulus 155. Shaft 215 may be rotated by ESP motor 130 (via the intervening shaft of seal section 135) and extend longitudinally and centrally through gas separator 125.

Auger 230 may be keyed to gas separator shaft 215 and may impart axial momentum to multi-phase well fluid travelling through separation chamber 205. Auger 230 may be a high-angle vane auger or similar fluid moving element. In some embodiments, an impeller and/or stage may be used in place of auger 230. In vortex-type gas separators 125, one or more vortex generators 235 may be included downstream of auger 230. Vortex generator 235 may be keyed to shaft 215 and may rotate with shaft 215. Generator 235 may impart multi-phase well fluid with a vortex-shaped trajectory through separation chamber 205, which may separate the multi-phase fluid into the respective higher density, gas poor fluid 305 and lower density, gas rich fluid 300 by inertia of rotation. In some embodiments, gas separator 125 may be a rotary type separator and may include a rotary rather than vortex generator 235.

Figure 3A:
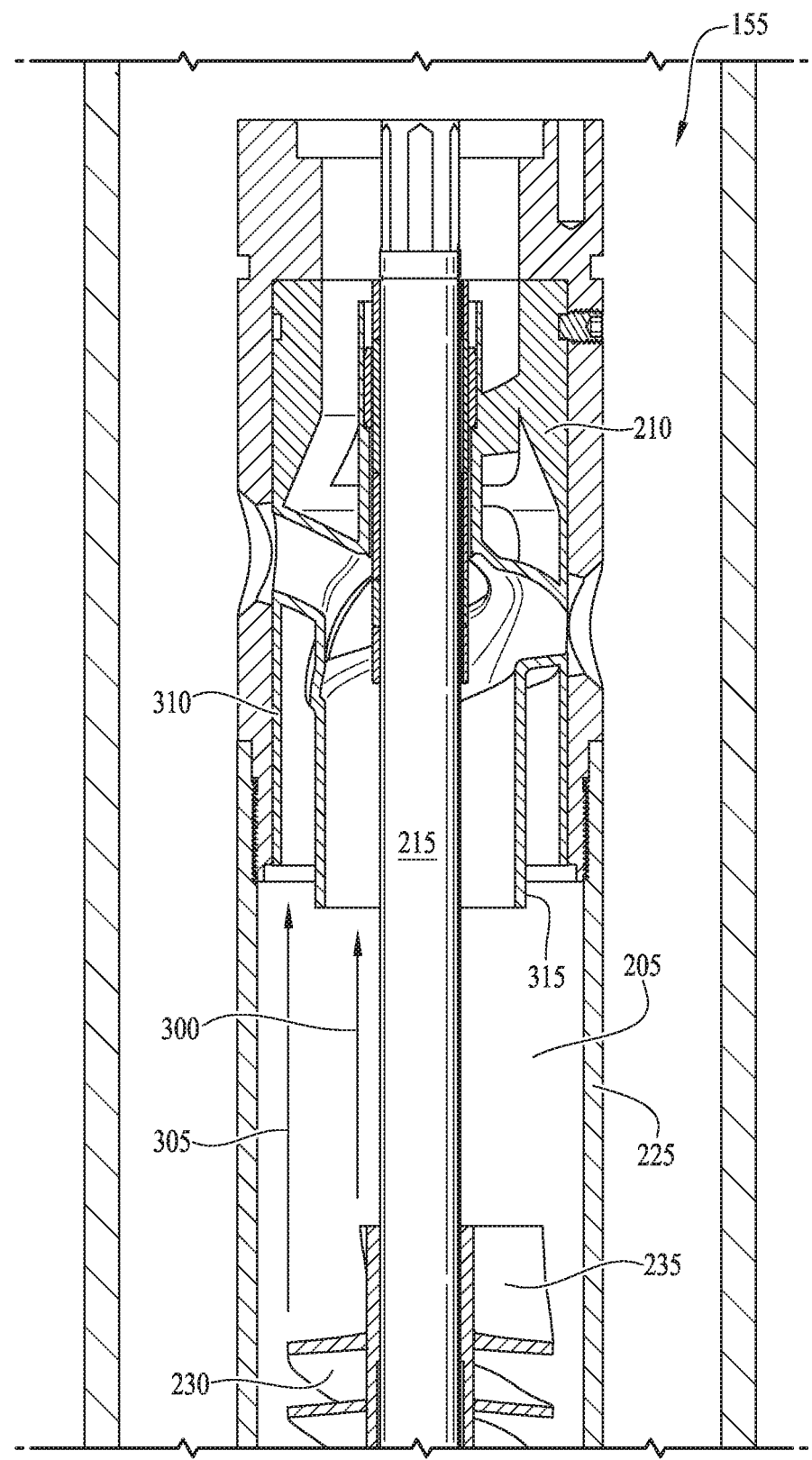
FIGS. 3A-3B are cross-sectional views of a separation chamber and crossover of an illustrative embodiment.
Figure 3B:
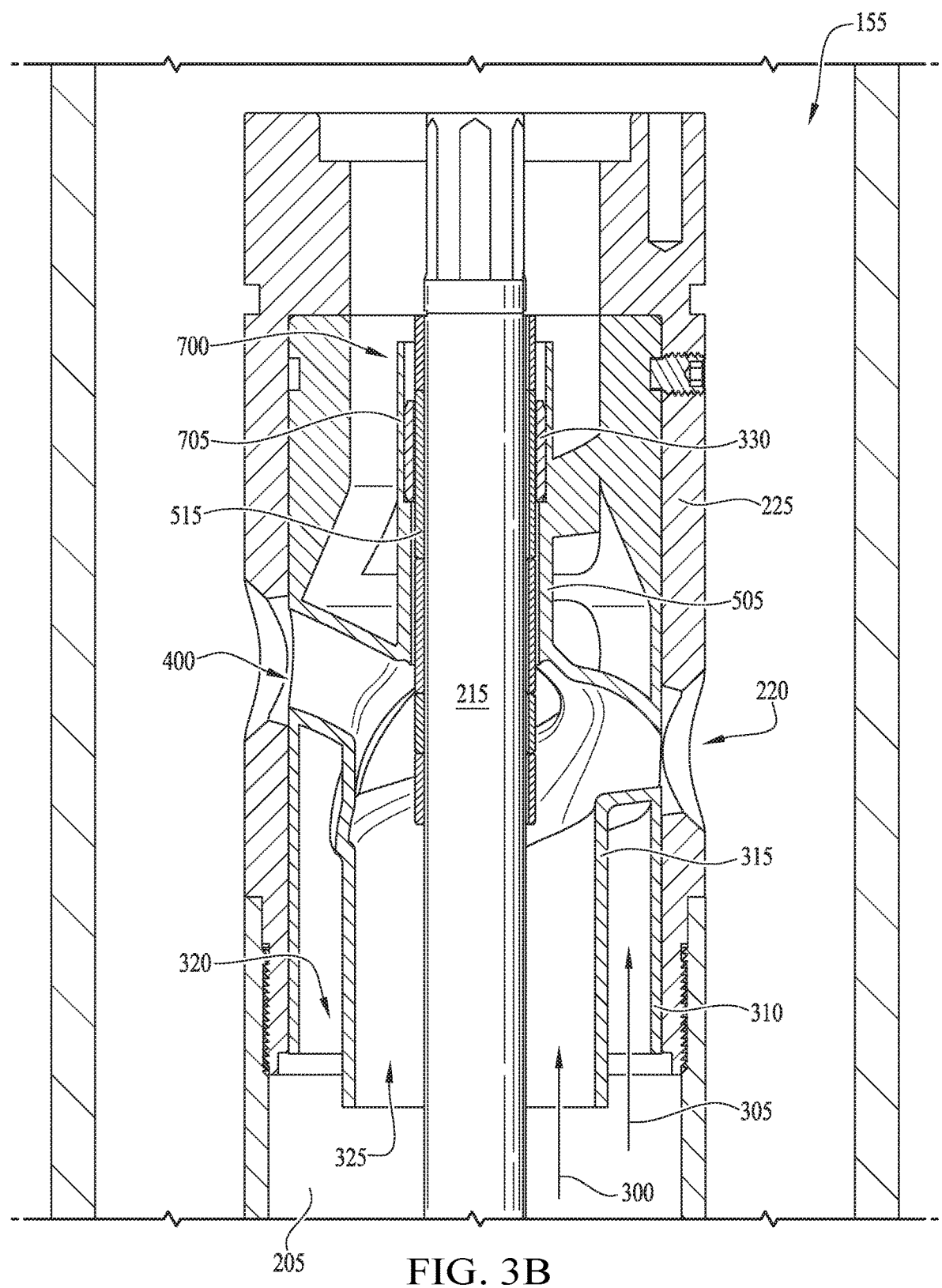

From separation chamber 205, the multi-phase fluid may proceed to crossover 210, where lower density, gas rich fluid 300 may be vented into casing annulus 155, while higher density, gas poor fluid 305 may continue to pump 120. As shown in FIGS. 3A-3B, due to rotational inertia, lower density, gas rich fluid stream 300 may gravitate close to shaft 215, flowing inside skirt 315 of crossover 210. Higher density, gas poor fluid 305 may gravitate outwards and travel into the space between jacket 310 and skirt 315.

For illustration purposes in FIGS. 3A-3B, fluid streams 300, 305 are shown flowing in a straight downstream direction, however, as a result of vortex generator 235 or a rotary, both streams are also rotating while flowing downstream and, as a result, may adopt a helical, screw-shaped, and/or spiral-shaped trajectory through crossover 210. Such a helical trajectory may be composed of an axial downstream component combined with a rotational component about a central longitudinal axis and/or shaft 215. The rotational component can follow a clockwise or a counterclockwise direction, depending on the rotational direction of shaft 215. Examples of helically-directed flow trajectories for higher density, gas poor fluid 305 and lower density, gas rich fluid stream 300 are illustrated in FIGS. 6A-6G. In this example, the rotational component of both helical fluid streams 300, 305 may be directed in a counterclockwise direction, for example following counterclockwise rotational direction 615 in FIG. 6A. Additionally, the rotational speed of fluid streams 300, 305 may be determined by the rotational speed of shaft 215 and/or ESP motor 130. Fluid streams 300, 305 in FIGS. 6A-6D may be rotating at or about 3550 RPM, resulting from ESP assembly 100's operation at 60 Hz. However, illustrative embodiments may be equally applied to an ESP assembly operating anywhere from 30 Hz to 70 Hz and driving the rotation of well fluid at higher or lower rotational speeds than 3550 RPM.

Figure 6A:
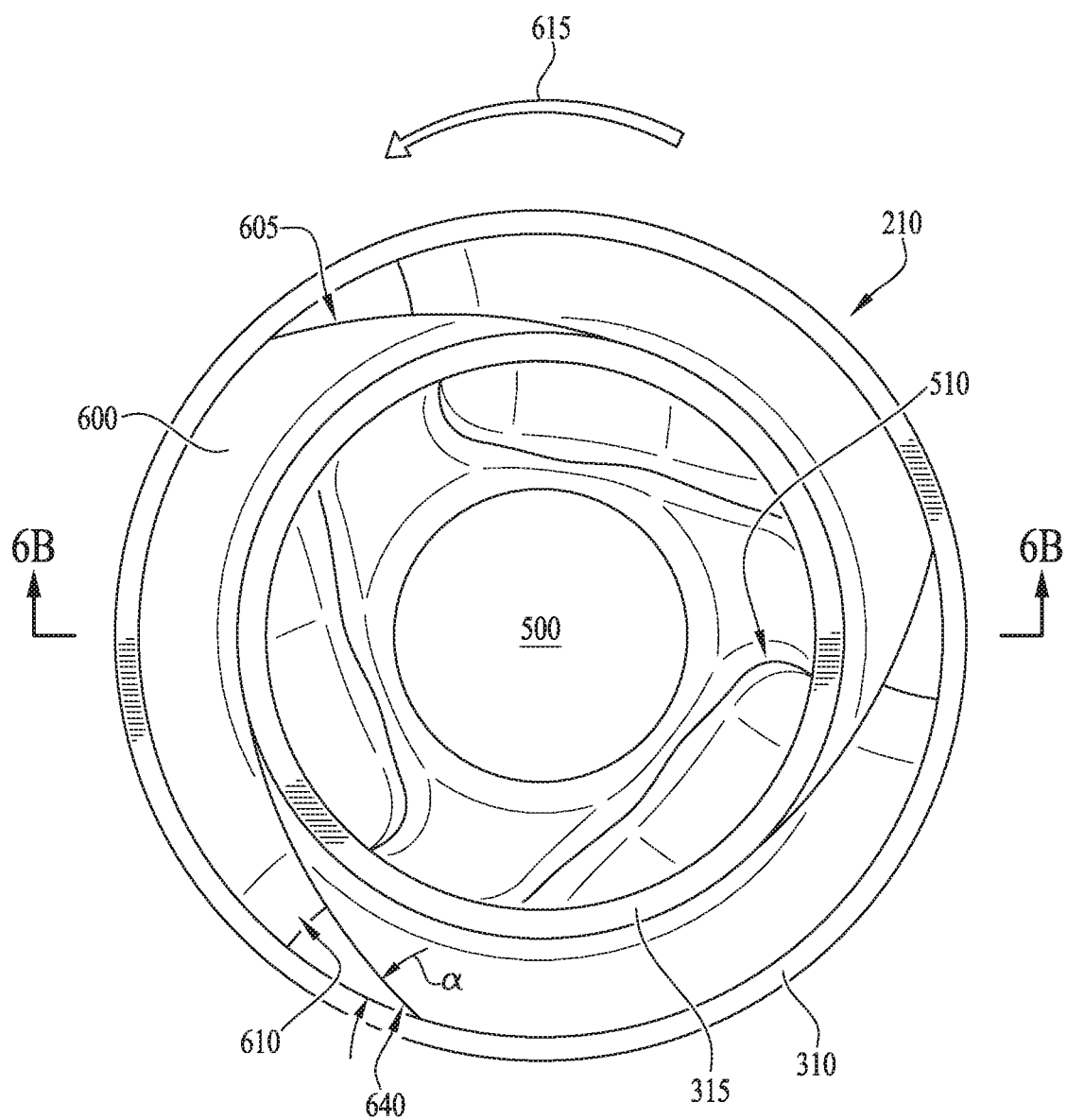
FIG. 6A is a bottom plan view of an exemplary crossover of an illustrative embodiment.
Figure 6B:
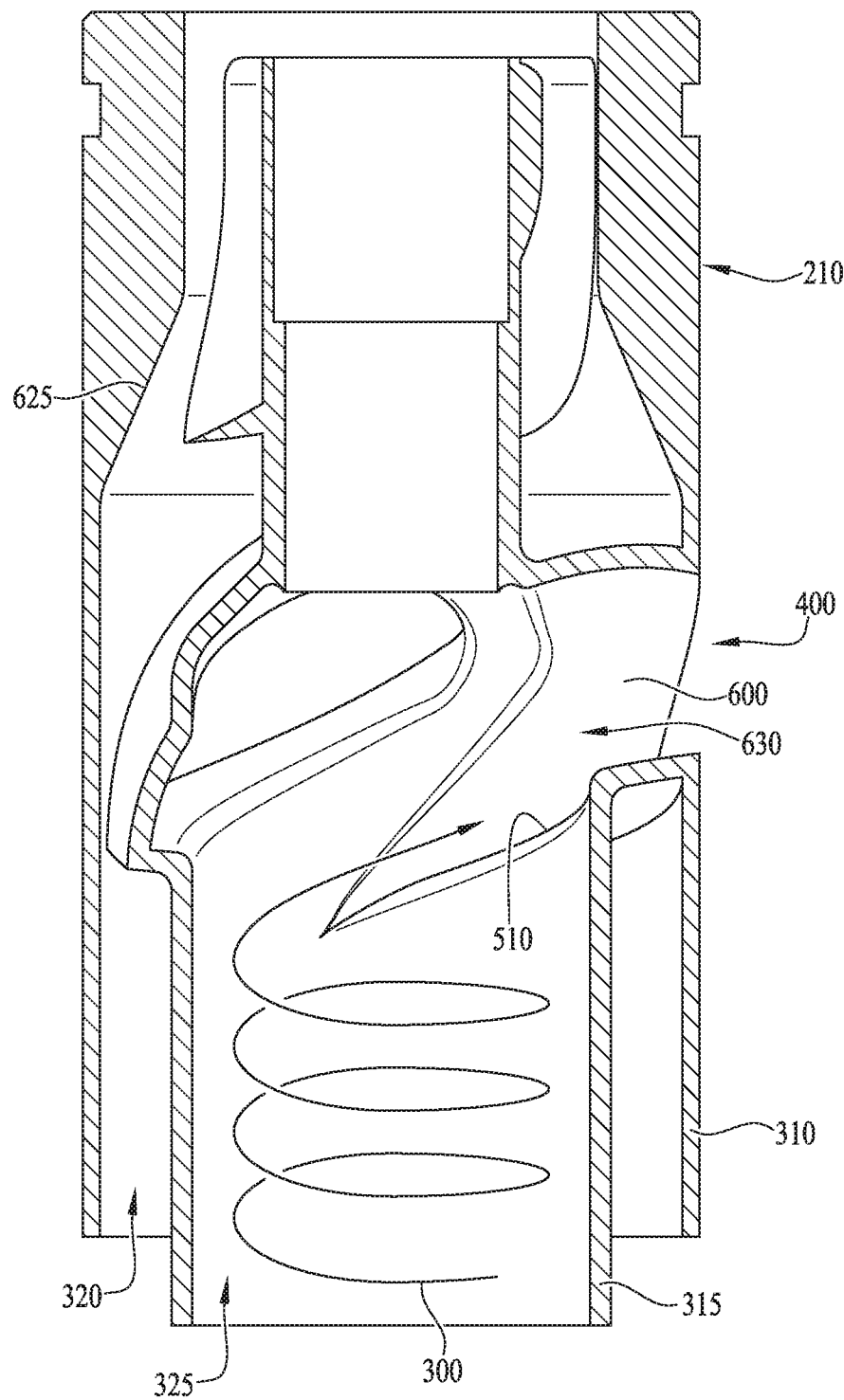
FIG. 6B is a cross-sectional view of an exemplary crossover of an illustrative embodiment.
Figure 6C:
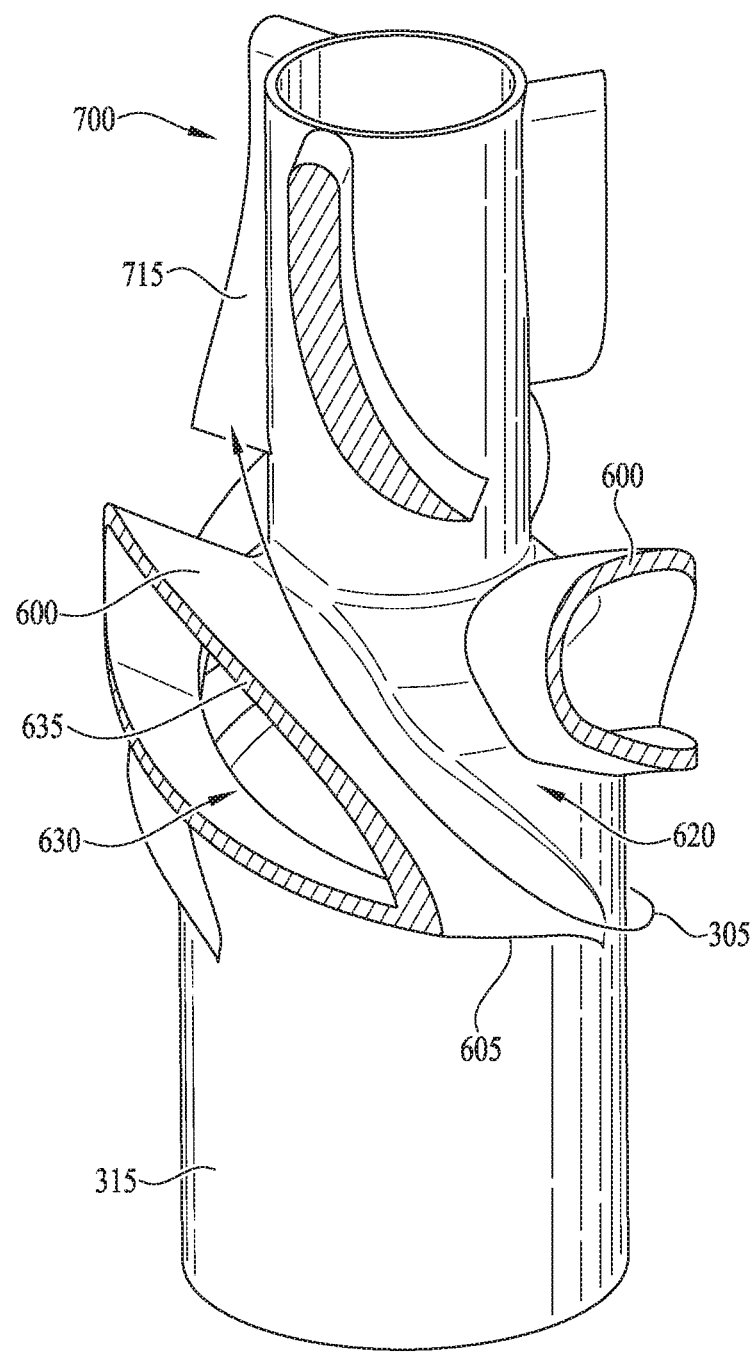
FIG. 6C is a perspective view of an exemplary skirt of an illustrative embodiment.
Figure 6D:
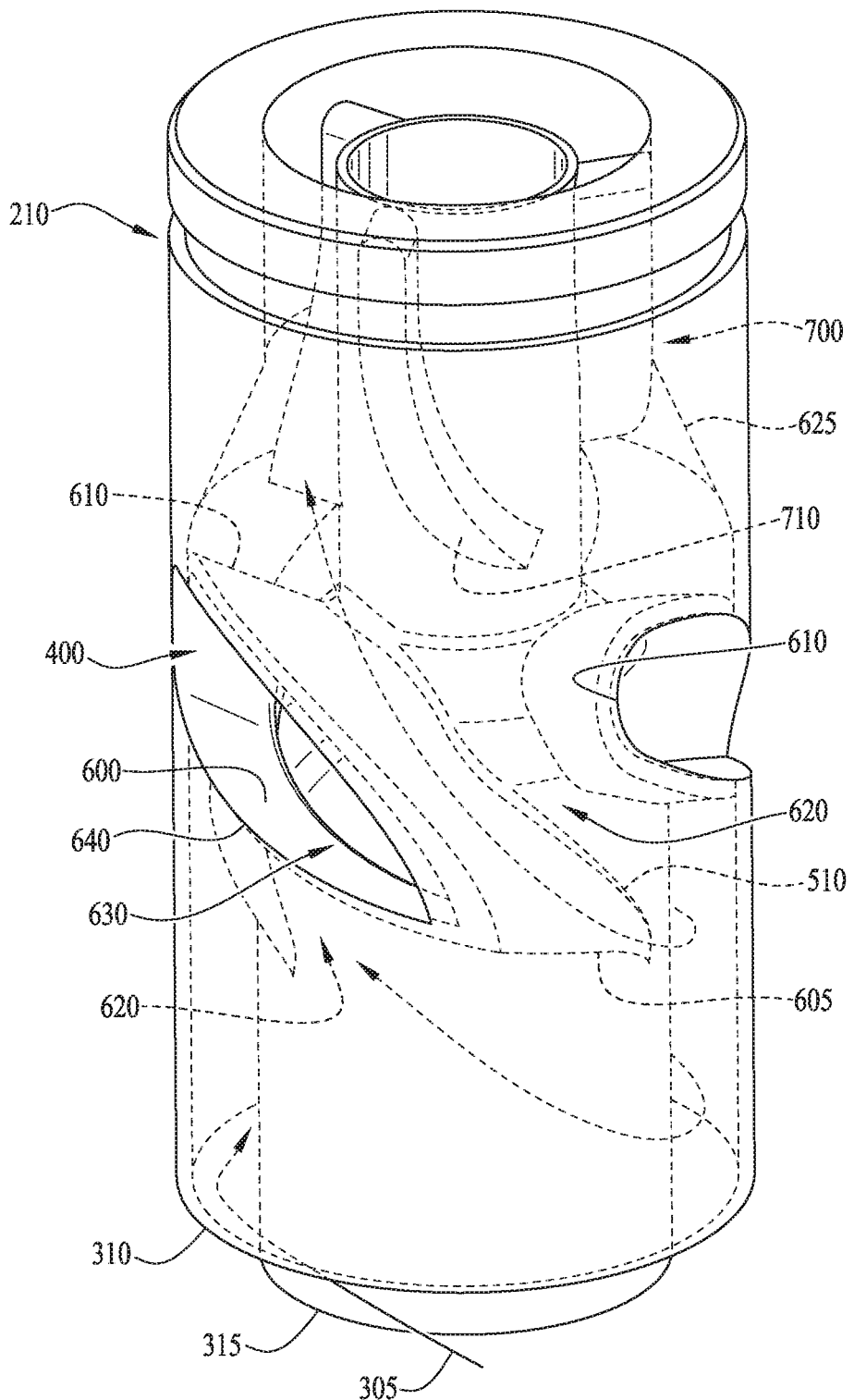
FIG. 6D is a perspective view of an exemplary crossover of an illustrative embodiment.

Turning to FIGS. 6C-6D, the crossover 210 of illustrative embodiments may include a plurality of teardrop shaped channels 600 oriented to follow the helical flow trajectories of fluid streams 300, 305 to beneficially reduce and/or prevent efficiency-reducing turbulence and/or gas accumulation. A first helical passageway 630 may extend through the inside of each channel 600 and may guide lower density, gas rich fluid 300 from inside skirt 315 to flow through channel 600 and vent into casing annulus 155. A second helical passageway 620 may be formed around the outside of each channel 600, through which higher density, gas poor fluid 305 may be guided downstream toward pump 120 intake. The geometry of the channels 600 of illustrative embodiments, and thus the geometry of first and second helical pathways 630, 620, may guide well fluid with improved separation efficiency and a reduced risk of reentrapped gas, as compared to conventional designs.

A plurality of teardrop shaped channels 600 may extend between and through crossover skirt 315 and crossover jacket 310. As perhaps best shown in FIG. 4 and FIG. 5, each channel 600 may be shaped like teardrop, leaf, or tapered oval, resulting in a similar shape of first helical passageway 630 enclosed inside channel 600. Channel 600 may include rounded side 610 opposite pointed side 605. Rounded side 610 may extend from skirt 315 to jacket 310 with a rounded, curved, or half-oval shape while pointed side 605 may extend from skirt 315 to jacket 310 with a pointed, sharpened, or tapered shape. The teardrop shape of each channel 600 may define upper channel surface 635, which upper channel surface 635 forms a top, supportive wall of each channel 600 and encloses the top of each first helical passageway 630. Upper channel surface 635 may extend from pointed edge 605 to rounded edge 610 on the top side of channel 600, with rounded edge 610 tilted 10-40° upward from pointed edge 605. The tilted orientation of upper channel surface 635 may guide higher density, gas poor fluid 305 upward at a 10-40° angle, thereby providing a gentle entrance and exit angle into second helical passageway 620. Three channels 600 are shown in FIGS. 6A-6D, however, more or less than three channels 600 may be employed in other embodiments, for example two, four, or six channels 600.

Figure 5:
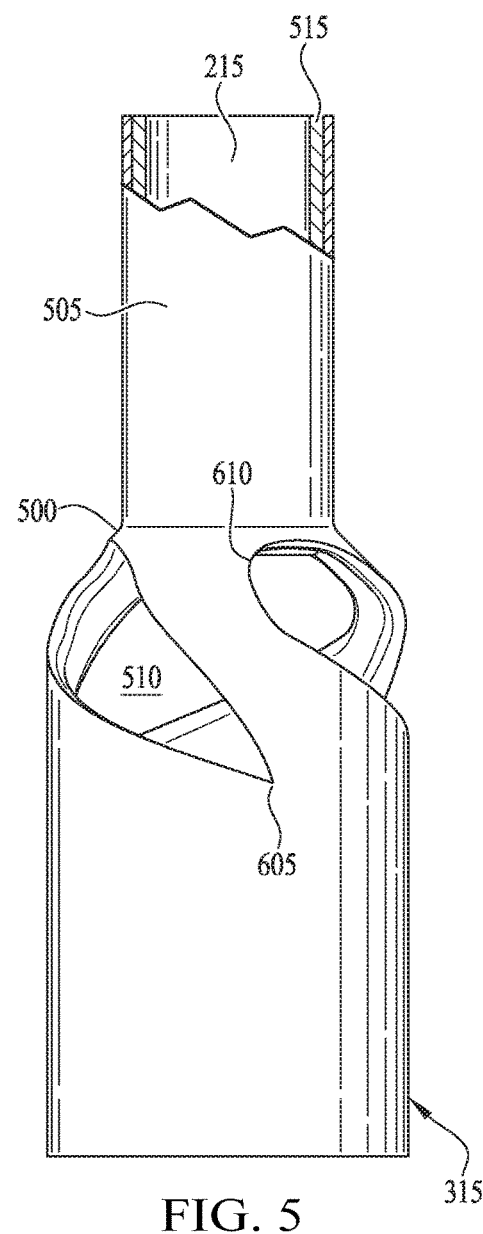
FIG. 5 is a side elevation view of an exemplary skirt of an illustrative embodiment.

Each of the plurality of teardrop shaped channels 600 may extend through skirt 315 to form channel entrance 510, which channel entrance 510 may fluidly couple first helical passageway 630 to lower density, gas rich fluid 300 inside inner chamber 325 enclosed by skirt 315. FIG. 5 shows a skirt 315 of an exemplary crossover 210 of illustrative embodiments. As shown in FIG. 5, skirt 315 includes a tubular body and a concave top portion, which concave portion extends inward as skirt 315 extends downstream. In some embodiments, skirt 315 may extend downward (upstream) further than jacket 310 so as to extend slightly into the top of separation chamber 205, as shown in FIG. 3B. Shaft aperture 500 may extend through the top of skirt 315, which shaft aperture 500 allows shaft 215 to extend centrally through crossover 210.

As shown in FIG. 5, passageway entrances 510 may be spaced around the concave (curved) top end of skirt 315. The intersection of channel 600 with skirt 315 may give each entrance 510 a teardrop shape mirroring that of channel 600. As a result of the concave top end of skirt 315, entrances 510 may curve along skirt 315, which may result in an orientation of entrances 510 directed tangentially to the helical flow path of lower density, gas rich stream 300, as shown in FIG. 6B. Positioning entrances 510 at the top, curved portion of skirt 315 may reduce turbulence and bubble coalesce. Each passageway entrance 510 may be larger in surface area than conventional apertures intended to serve a similar purpose in traditional crossovers, such as 10-70% larger.

Figure 4:
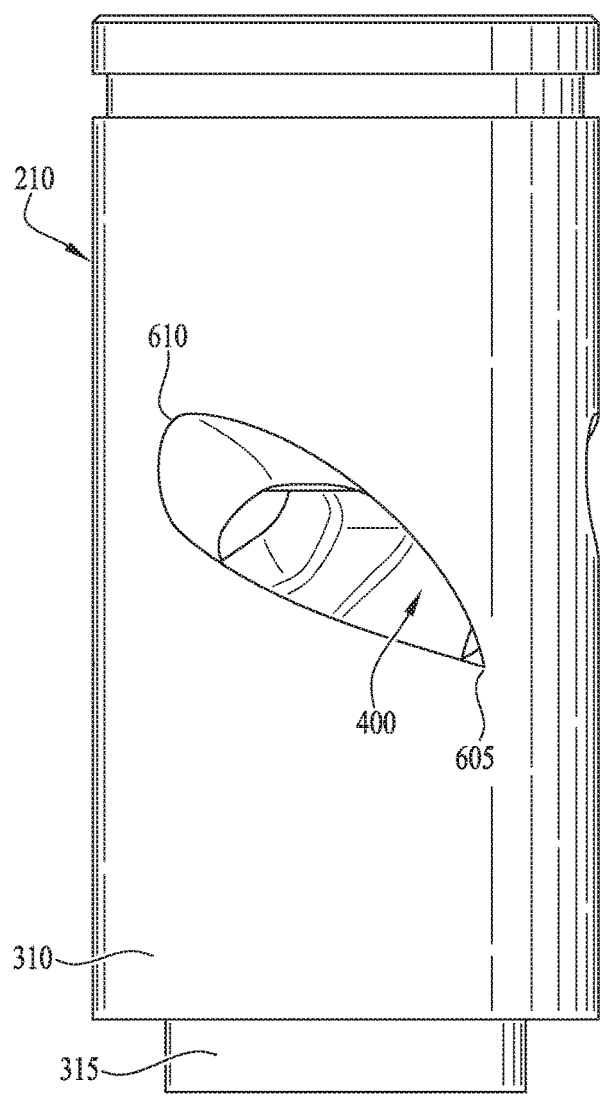
FIG. 4 is a side elevation view of an exemplary crossover of an illustrative embodiment.

Each of the plurality of teardrop shaped channels 600 may extend through jacket 310 to form exit 400, which exits 400 fluidly couple lower density, gas rich fluid 300 inside first helical passageway 630 to casing annulus 155 for ventilation. FIG. 4 shows a jacket 310 of an exemplary crossover 210 of illustrative embodiments. Crossover 210 may include tubular jacket 310 circumferentially surrounding skirt 315 with a space between them. Jacket 310 may extend axially downward from the top of crossover 210 and/or the base of pump 120 to the top of separation chamber 205. Jacket 310 may be installed directly inside housing 225 and may be coupled to housing 225 with a bolted, threaded, friction-fit, and/or similar connection so as to secure crossover 210 inside housing 225. As shown in FIG. 3B, each exit 400 may be axially aligned inward of a corresponding housing port 220, which housing ports 220 may allow ventilation into casing annulus 155. Housing ports 220 may be similarly shaped, sized, and/or oriented to that of exit 400 to allow for a continuously unimpeded flow path for gas rich fluid 300 during ventilation. In some embodiments, housing ports 220 may be larger than exits 400 to enlarge the surface area exposed to lower density, gas rich stream 300 during ventilation.

As shown in FIG. 4, exits 400 may be spaced out around jacket 310. Each exit 400 may be located near the axial center point of jacket 310, for example extending the middle fourth or middle third of jacket 310. In other embodiments, exits 400 may be above or below the center of jacket 310 and/or may extend for longer or shorter axial distances. Because exit 400 is formed at the intersection of channel 600 and jacket 310, each exit 400 may have the tilted teardrop shape of channel 600. In this way, the geometric benefits of the teardrop shapes of channel 600 and/or first helical passageway 630 may be retained throughout their lengths, moving from teardrop shaped entrances 510 to teardrop shaped exit 400.

Instead of extending from skirt 315 and approaching jacket 310 head-on (perpendicularly), each channel 600 may curve to intersect jacket 310 tangentially and form tangential intersection 640. Referring to FIGS. 6A and 6D, tangential intersection 640 may be formed by a channel 600 that curls following the tubular curve of jacket 310 so as to approach and intersect channel 600 tangentially. Tangential intersection 640 may guide lower density, gas rich fluid 300 out of exit 400 with a curved trajectory similar to the curve of channel 600, instead of a perpendicular exit path that may force abrupt turns and induce fluid turbulence. As shown in FIG. 6A, such a curved path of gas rich fluid 300 may exit first helical passageway 630 into casing annulus 155 with gas rich exit angle a, which gas rich exit angle a is the angle with which gas rich fluid 300 intersects jacket 310 when exiting through exit Gas rich exit angle a may mirror the tangential direction of channel 600's tangential intersection 640 and may serve as a gentle exit angle for lower density, gas rich fluid 300 that reduces turbulence as gas rich fluid 300 exits first helical passageway 630.

During operation, entrance 510 and exit 400 may gently guide lower density, gas rich fluid 300 into and out of first helical passageway 630 with tangential direction components that induce gentle entrance and exit angles. The curved orientation of entrances 510 along skirt 310, resulting from skirt 310's concave top section, may form a tangential component that guides lower density, gas rich fluid 300 into first helical passageway 630 with a gentle entry angle that minimizes turbulence and flow disruption. Similarly, channel 600's tangential intersection 640 may allow exit 400 to guide lower density, gas rich fluid 300 with gas rich exit angle a, which exit angle a may prevent and/or reduce flow turbulence. First helical passageway 630 may curve between entrance 510 and exit 400 and, as a result, may gently guide lower density, gas rich fluid 300 from skirt 315 to casing annulus 155, which may beneficially reduce turbulence in gas rich fluid 300. By minimizing flow turbulence and/or disruption, first helical passageways 630 of illustrative embodiments may increase separation efficiency inside gas separator 125 and/or reduce the likelihood of gas reentrapment and the resulting gas lock.

Similarly, channels 600 may define second helical passageways 620 around channels 600, which second helical passageways 620 guide higher density, gas poor fluid 305 around the outside of channel 600's teardrop shape. Similar to first helical passageway 630, second helical passageway 620 may be geometrically configured to tangentially guide gas poor fluid 305 into and out of second helical passageway 620 with gentle angles that minimize fluid turbulence and and/or abrasive wear inside crossover 210. Referring to FIG. 6D, higher density, gas poor fluid 305 may be directed helically, rotating about skirt 315 while flowing downstream. Upon reaching channel 600, higher density, gas poor fluid 305 may be guided into second helical passageway 620, following support wall 635 around the top of channel 600 at a 10-40° angle. Higher density, gas poor fluid 305 may contact pointed side 605, which pointed side 605 of channel 600 may gently guide gas poor fluid 305 into second helical passageway 620 through the space above channel 600. The small surface area of pointed side 605 may minimize the contact area between channels 600 and gas poor fluid 305, thereby reducing fluid collisions that cause turbulence and/or abrasive wear.

As described herein, upper channel surface 635 may tilt upward 10-40° as support wall 635 extends from pointed side 605 to rounded edge 610 on the top side of channel 600. Further, upper channel surface 635 may curve around skirt 315, following the curved shape of skirt 315's concave surface. During operation, higher density, gas poor fluid 305 may be guided upward with an angle of 10-40° while curving naturally about skirt 315, as shown in FIGS. 6C-6D. Higher density, gas poor fluid 305 may follow upper channel surface 635 and/or second helical passageway 620 up and around skirt 315 at which time gas poor fluid 305 may exit second helical passageway 620 through the space above rounded side 610. By concurrently tilting upward and curving around skirt 315 in a helical fashion, second helical passageway 620 may be oriented with a tangential component that mirrors the natural flow path of higher density, gas poor fluid 305 induced during centrifugal separation. In this way, higher density, gas poor fluid 305 may be guided through second helical passageway 620 with gentle entry and exit angles that reduce disruption to gas poor fluid 305's flow, thereby reducing and/or preventing turbulence and abrasive wear.

The helical trajectory of higher density, gas poor fluid 305, while beneficial for separation, may include a pre-rotation component that, if maintained when delivered to pump 120, may degrade the efficiency and production rate of pump 120. Illustrative embodiments may include an improved spider bearing 700, which spider bearing 700 serves to reduce and/or prevent pre-rotation of fluid while providing radial support to shaft 215.

Figure 6E:
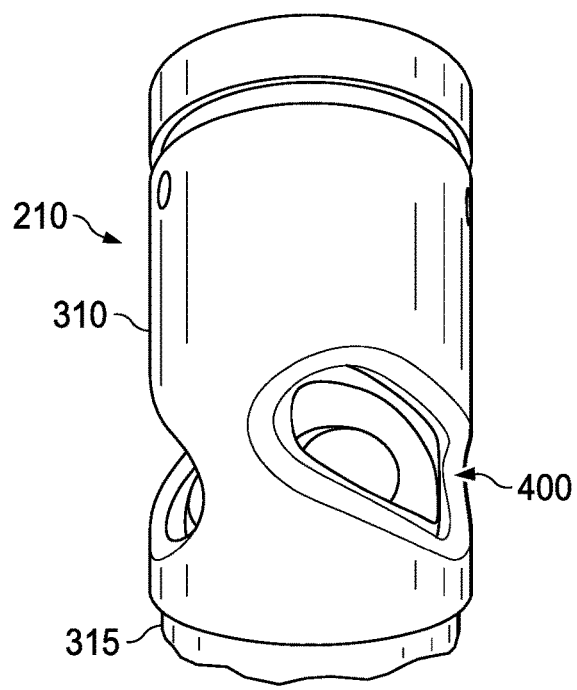
FIG. 6E is a perspective view of an exemplary crossover with adjustable jacket of an illustrative embodiment.
Figure 6F:
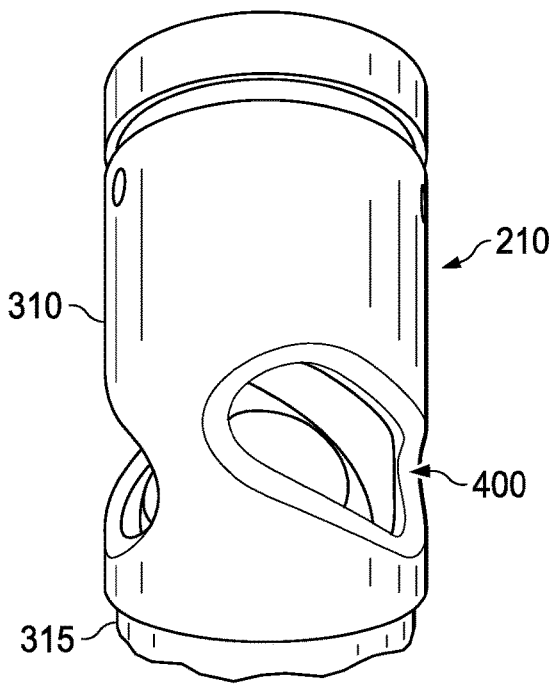
FIG. 6F is another perspective view of an exemplary crossover with adjustable jacket of an illustrative embodiment.
Figure 6G:
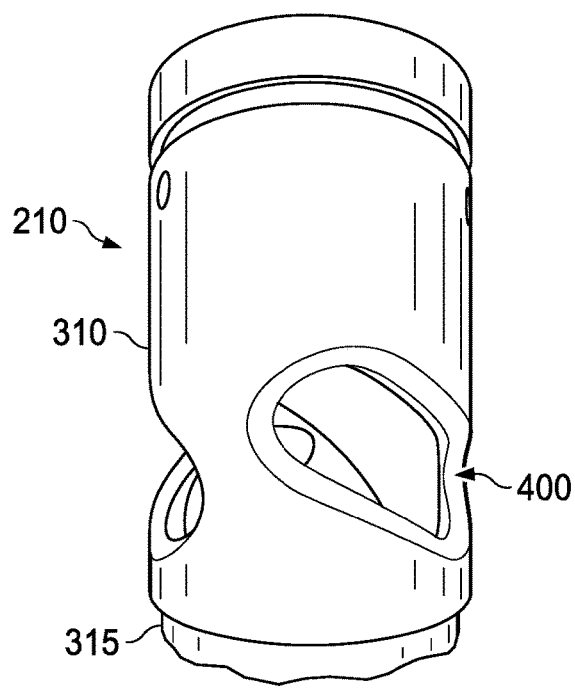
FIG. 6G is yet another perspective view of an exemplary crossover with adjustable jacket of an illustrative embodiment.

The position of the jacket 310 with respect to the skirt 315 can be adjusted. The jacket 310 can be rotated about the skirt 315 to control the volume of the fluids through the exits 400. In some applications, the flow rate of the pump 120 can cause fluids to enter the separator 125 through the exits 400. As such, the ability to adjust the jacket 310 to control the volume of fluid through the exits 400 can improve the overall functionality of the crossover 210. The design also lends itself to being a flow control in applications where the fluid moving capability of the separator 125 is much greater than the pump requirement and therefore opened for greater flow exiting the separator 125 before reaching the pump 120. FIGS. 6E-6G illustrate the jacket 310 in a first position, FIG. 6E, to allow for maximum flow through exits 400, a second position, FIG. 6F, to allow for a partially flow through exits 400, and a third position, FIG. 6G, to allow for minimum flow through the exits 400. The jacket 310 of the crossover 210 can be made from proven bonded material such as stainless steel, which has the strength to withstand the harsh operating conditions of a downhole well.

Figure 7A:
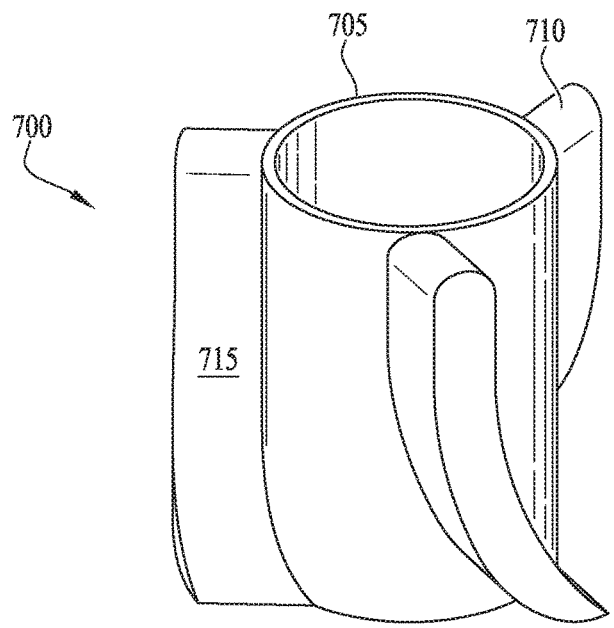
FIG. 7A is a perspective view of an exemplary spider bearing of an illustrative embodiment.
Figure 7B:
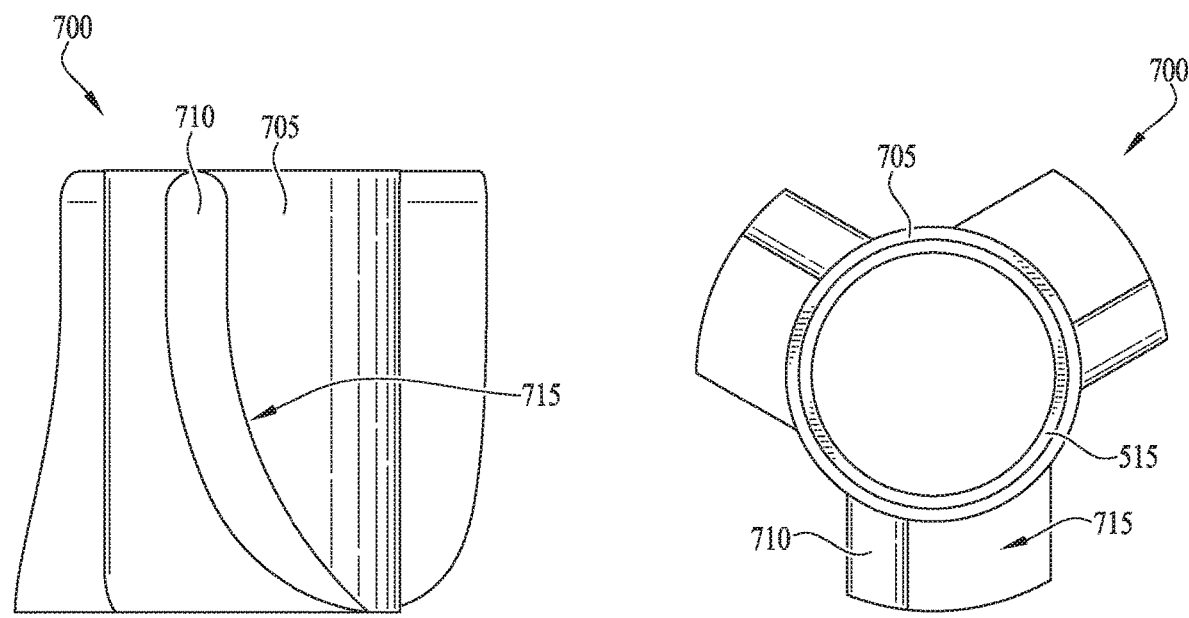
FIG. 7B is a side elevation view of an exemplary spider bearing of an illustrative embodiment.
Figure 7C:
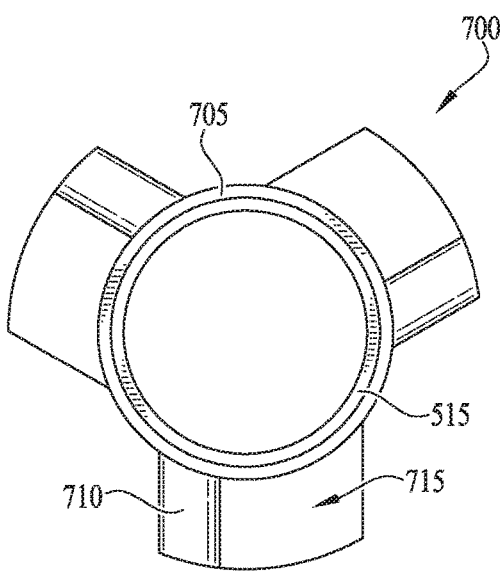
FIG. 7C is a top plan view of an exemplary spider bearing of an illustrative embodiment.

Returning to FIGS. 3B and 5, axial tube 505 may extend downstream from skirt 315 and may enclose shaft 215. One or more spacer sleeves 515 may be stacked around shaft 215 and separate axial tube 505 from shaft 215. Several spacer sleeves 515 may be stacked around shaft 215 and may provide radial support to shaft 215. Spider bearing 700 of illustrative embodiments may be included inside jacket 310 downstream of passageway exit 400 and/or skirt 315. An exemplary spider bearing 700 is shown in FIGS. 7A-7C. Spider bearing 700 may include bearing hub 705, which hub 705 may fit around one or more spacer sleeves 515 above axial tube 505. In certain embodiments, bearing hub 705 may be integral to axial tube 505 or may be stacked coaxially above axial tube 505 in other embodiments. In some embodiments, bushing 330 may be included between spacer sleeve 515 and spider bearing hub 705, as shown in FIGS. 3B and 7C. In one example, bushing 330 may be pressed and held static between spacer sleeve 515 and bearing hub 705. Spacer sleeve 515 may be coupled to shaft 215 so as to rotate with shaft 215, which may provide radial support and wear protection.

During operation, higher density, gas poor fluid 305 exiting second helical passageway 620 may be directed downstream through flow chute 625. Referring to FIGS. 6B and 6D, flow chute 625 may extend upward above skirt 315. Chute 625 may be shaped like an inverted funnel, sloping inward and/or narrowing as chute 625 extends downstream. Chute 625 may define a space for fluid to flow around axial tube 505. Flow chute 625 may receive higher density, gas poor fluid 305 exiting second helical passageway 620 and direct the fluid inward toward axial tube 505. Higher density, gas poor fluid 305 may proceed downstream toward spider bearing 700 through flow chute 625, for example shown in FIG. 6D.

Spider bearing 700 may receive the rotating higher density, gas poor fluid 305 from second helical passageway 620 and remove rotational momentum from the higher density, gas poor fluid. Higher density, gas poor fluid may be redirected with an axial component that prevents and/or reduces pre-rotation of gas poor fluid 305 as the fluid enters pump 120. Referring to FIGS. 7A-7C, spider bearing 700 may include a plurality of spider vanes 710 extending radially from bearing hub 705 toward jacket 310. In some embodiments, spider vanes 710 may contact the inside diameter of jacket 310 in order to maintain radial strength and/or provide radial support to shaft 215. Three spider vanes 710 are shown FIGS. 7A-7C, however, two, five or six spider vanes 710 may be employed in other embodiments. Each spider bearing vane 710 may be crescent-shaped or shaped like the bottom half of a horizontally-cut "C". The top portion of vanes 710 may extend vertically or substantially vertically along hub 705's outer diameter. The lower portion of vanes 710 may curve towards horizontal to form a ramp that curves from near-horizontal to vertical as vane 710 extends from bottom to top.

Spider bearing 700 vanes 710 may be curved to with a concave surface that receives oncoming higher density, gas poor fluid 305, which fluid stream 305's helical trajectory may include a rotational component directed counterclockwise, for example following counterclockwise rotation direction 615 in FIG. 6B. As a result, higher density, gas poor fluid 305 flowing toward spider bearing 700 may contact curved face 715 of bearing vane 710. Higher density, gas poor fluid stream 305 may be coerced upwards, following the increasingly straightened shape of vane 710. In this way, spider bearing 700 may convert rotational momentum into axial momentum thus reducing and/or preventing pre-rotation of fluid entering pump 120 and increasing the efficiency and performance of pump 120. Further, spider bearing 700 may provide radial strength during operation, thus preventing operation-limiting damage to ESP assembly 100.

Illustrative embodiments may reduce turbulence in fluid flowing through the crossover of a gas separator by improving the geometry of the crossover's passageways. Illustrative embodiments may include a plurality of channels defining first helical passageways inside the channels for lower density, gas rich fluid and second helical passageways around the outside of the channels for higher density, gas poor fluid. The first and second helical passageways may guide the corresponding fluid streams into and out of the passageways with a tangential component that provides gentle entrance and exit angles for the fluid, which may reduce turbulence, gas reentrapment, erosion and/or abrasive wear. Illustrative embodiments may guide lower density, gas rich fluid through the first helical passageways toward the casing annulus for ventilation with improved momentum and a reduced likelihood of gas reentrapment and the resulting gas lock. Illustrative embodiments may deliver higher density, gas poor fluid through the second helical passageways to a centrifugal pump with reduced pre-rotation, which improves the pump's efficiency and overall performance. Illustrative embodiments may reduce scale blocking, erosion, and abrasive damage resulting from higher density, gas poor fluid carrying sand into the gas separator. Illustrative embodiments may include a spider bearing with modified vanes that remove rotational momentum from the higher density, gas poor fluid, which may reduce pre-rotation in the centrifugal pump. Illustrative embodiments may enhance the efficiency of the crossover and improve the overall performance of the gas separator and centrifugal pump.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A crossover of an electric submersible pump (ESP) gas separator comprising: a teardrop shaped channel extending helically between and through:
   a crossover skirt at an entrance to the channel, the crossover skirt inwards of a crossover jacket;
   the crossover jacket at an exit of the channel, the exit of the channel above the entrance to the channel;
   the teardrop shape of the channel having: a rounded side opposite a pointed side and a top channel surface extending therebetween, wherein the top channel surface extends between ten degrees and forty degrees upward from the pointed side;
   the channel defining: a first helical passageway inside the channel for lower density, gas rich fluid flowing inside the passageway, wherein the first helical passageway tangentially intersects the crossover jacket; and a second helical passageway around the channel for higher density, gas poor fluid flowing outside of the passageways; and
   a spider bearing fluidly coupled to the higher density, gas poor fluid downstream of the second helical passageway, the spider bearing comprising: a plurality of crescent-shaped spider vanes extending radially outward from a spider bearing hub, the crescent shaped spider vanes having a concave surface that receives incoming higher density, gas poor fluid.

2. The crossover of an ESP gas separator of claim 1, wherein the crossover jacket is secured inside a gas separator housing downstream of one of a rotary or vortex generator.

3. The crossover of an ESP gas separator of claim 1, wherein the channel exit is aligned with a housing port through a gas separator housing such that the channel exit is fluidly coupled to a casing annulus.

4. The crossover of an ESP gas separator of claim 1, wherein the channel entrance is positioned on a concave top portion of the crossover skirt.

5. The crossover of an ESP gas separator of claim 4, wherein the position of the channel entrance on the concave top portion of the crossover skirt curves the channel entrance to tangentially align with the curvature of the lower density, gas rich fluid entering the channel entrance.

6. The crossover of an ESP gas separator of claim 1, wherein the channel entrance is 10-70% larger than entrance ports in comparable conventional gas separator designs.

7. The crossover of an ESP gas separator of claim 1, wherein the channel curves as the channel extends upward from the crossover skirt to the crossover jacket.

8. The crossover of an ESP gas separator of claim 1, wherein the tangential intersection guides fluid out the crossover exit tangentially to an inner wall of the crossover jacket.

9. The crossover of an ESP gas separator of claim 1, wherein the spider bearing imparts axial momentum into the higher density, gas poor fluid exiting flowing around the passageways.

10. The crossover of an ESP gas separator of claim 1, wherein the spider bearing provides radial support to a shaft extending centrally through the crossover.

11. The crossover of an ESP gas separator claim 1, wherein the higher density, gas rich fluid is delivered to a centrifugal pump with lower GVF (Gas Volume Fraction) and reduced pre-rotation.

12. The crossover of an ESP gas separator claim 1, wherein the crossover jacket is rotatable around the crossover skirt.

13. A crossover of an electric submersible pump (ESP) gas separator comprising:
   a first helical pathway that guides gas poor, higher density fluid at an angle of 10 to 40 degrees from a horizontal plane as the gas poor, higher density fluid travels through the crossover, the first helical pathway fluidly coupled to a spider bearing comprising crescent shaped vanes that remove rotational momentum from the gas poor, higher density fluid as the gas poor, higher density fluid exits the crossover; and
   a second helical pathway that guides gas rich, lower density fluid tangentially through an exit port of the crossover that vents to a casing annulus; and the first helical pathway and the second helical pathway are defined by a channel having a teardrop shaped opening in a crossover jacket that defines the exit port and a teardrop shaped opening in the crossover skirt that defines an entrance to the channel, where the first helical pathway is around the channel and the second helical pathway is through an inside of the channel.

14. The crossover of an ESP gas separator of claim 13, wherein the teardrop shaped opening in the crossover skirt are positioned on a concave top portion of the skirt.

15. The crossover of an ESP gas separator of claim 14, wherein the curved orientation of the tear drop shaped opening extending around the concave top portion of the skirt provides the lower density, gas rich fluid a tangentially oriented entrance to the gas poor fluid helical passageway.

16. The crossover of an ESP gas separator of claim 13, wherein the teardrop shaped opening on the crossover skirt is 10-70% larger in surface area than conventional crossover skirt openings.

17. The crossover of an ESP gas separator of claim 13, wherein a top surface of the channel extends upward at ten to forty degrees from horizontal and guides the higher density, gas poor fluid upward at same trajectory.

18. The crossover of an ESP gas separator of claim 13, wherein the channel tangentially intersects the jacket.

19. The crossover of an ESP gas separator of claim 13, wherein the spider bearing imparts axial momentum to the higher density, gas poor fluid traveling around the passageways and continuing past the spider bearing.

20. The crossover of an ESP gas separator of claim 13, wherein the spider bearing provides radial support to a drive shaft extending through the crossover.

21. The crossover of an ESP gas separator of claim 13, comprising a plurality of the channels.

22. A method of separating higher density, gas poor fluid from lower density, gas rich fluid in a gas separator that operates to separate multi-phase fluid by rotational inertia comprising:
    maintaining a helical trajectory of lower density, gas rich fluid by sending the lower density, gas rich fluid through an inside of a helically extending, teardrop-shaped channel that vents to a casing annulus;
    preserving a helical trajectory of higher density, gas poor fluid by sending the higher density, gas poor fluid around the helical channel; and
    removing rotational momentum from the higher density, gas poor fluid after the higher density, gas poor fluid passes around the helical channel, by guiding the higher density, gas poor fluid through a spider bearing having crescent shaped vanes and a concave surface that curves in a direction opposite the rotational direction of the higher density, gas poor fluid.

23. The method of claim 22, further comprising delivering the higher density, gas poor fluid to a pump intake with lower rotational momentum and GVF (Gas Volume Fraction) than fluid entering the gas separator.

\* \* \* \* \*